United States Patent

Revelli et al.

[11] Patent Number: 4,774,615
[45] Date of Patent: Sep. 27, 1988

[54] MAGNETO-OPTIC READ-OUT METHOD AND APPARATUS WITH POLARIZATION CORRECTION MEANS

[75] Inventors: Joseph F. Revelli, Rochester; Douglas G. Stinson, Fairport; Stuart D. Perry, Leroy, all of N.Y.

[73] Assignee: Eastman Kodak Company, Rochester, N.Y.

[21] Appl. No.: 15,753

[22] Filed: Feb. 17, 1987

[51] Int. Cl.[4] .................................................. G11B 11/00
[52] U.S. Cl. ...................................... 360/114; 369/13; 369/110; 365/122
[58] Field of Search ................. 369/13, 110, 44, 45, 369/46, 106; 360/114, 59; 365/122; 350/393; 455/616, 619; 370/2

[56] References Cited

U.S. PATENT DOCUMENTS

| | | | |
|---|---|---|---|
| 4,243,850 | 1/1981 | Edwards | 369/46 |
| 4,410,277 | 10/1983 | Yamamoto et al. | 365/122 |
| 4,503,324 | 3/1985 | Yokata | 369/45 |
| 4,652,737 | 3/1987 | Kowalski et al. | 369/45 |
| 4,729,122 | 3/1988 | Itoh | 369/13 |

FOREIGN PATENT DOCUMENTS 61-05459  1/1986  Japan ............................ 360/114

Primary Examiner—Raymond F. Cardillo
Assistant Examiner—Hoa T. Nguyen
Attorney, Agent, or Firm—Warren W. Kurz

[57] ABSTRACT

Disclosed herein are an improved method and apparatus for optically reading pre-recorded magnetic information on a magneto-optic recording element. The invention addresses the technical problem of minimizing the adverse effect of unpredictable variations in the state of polarization of the beam of radiation used for read-out. Such variations may be produced, for example, by birefringence variations in a transparent layer or substrate through which the recorded information is recovered. According to the invention, the undesired polarization variations are sensed from the system's output signal, and an error signal representative of such variations is produced. Such error signal is used to adjust the state of polarization of the read-out beam prior to detection by the system's detector elements. Preferably, the read beam is directed through the combination of a quarterwave plate and a Faraday rotator, and the error signal is used to control the magnetic field of the Faraday rotator. In effect, the combination of the quarterwave plate and Faraday rotator behaves like a variable phase retardation plate as far as the resultant output signal is measured by differential detection is concerned.

10 Claims, 5 Drawing Sheets

MAGNETO-OPTIC READ-OUT METHOD AND APPARATUS WITH POLARIZATION CORRECTION MEANS

BACKGROUND OF THE INVENTION

This invention relates to the field of magneto-optic recording. More particularly, it relates to improvements in methods and apparatus for optically reading magnetically recorded patterns on a magneto-optic recording element.

The method of optically reading magnetically recorded information by use of the magneto-optic Kerr effect is well known. Such method basically involves steps of irradiating a previously recorded magneto-optic media with a continuous-wave beam of plane polarized radiation (e.g. emanating from a c-w laser), and detecting small clockwise or counter clockwise rotations, typically on the order of 2° or less, in the plane of polarization of the reflected beam. The direction of such rotation, of course, is determined by the state of vertical magnetization (either up or down) of the irradiated magnetic domains representing the recorded information.

Presently preferred magnetic-optic recording elements basically comprise a relatively thick (e.g. one or two millimeters) transparent substrate which supports a relatively thin (e.g. 100 nanometers) layer of magneto-optic recording media. The magneto-optic media may comprise any of a variety of compounds which exhibit a relatively strong Kerr effect, and presently preferred materials include thin films of a transition metal/rare earth alloy. During read-out, the magneto-optic media is irradiated through its transparent substrate.

For a variety of reasons, not the least of which is economy, the transparent substrate of a magneto-optic recording element usually takes the form of a clear plastic (e.g. polycarbonate) disk. Plastic is preferred owing to its capability of being injection molded. While clear plastic disks of relatively high optical quality can be produced by conventional injection-molding techniques, these disks often exhibit a certain amount of stress-induced birefringence which, unfortunately, varies from point-to-point over the disk surface. As the recording element is scanned during read-out, the substrate's varying birefringence has the adverse effect of slightly changing the state of polarization (both angle and ellipticity) of the reflected beam, giving rise to relatively low frequency (e.g. a few KHz.) noise component in the relatively high frequency (e.g. several MHz.) read-out signal. This low frequency noise component tends to amplitude modulate the much higher frequency read-out signal, as well as to bias the average value of such signal to a slowly varying level about zero. While the amplitude modulation of the read-out signal effectively reduces the available output signal, the bias has a more serious effect in that it undermines the common mode rejection technique associated with conventional differential detection schemes.

SUMMARY OF THE INVENTION

In view of the foregoing, an object of this invention is to provide an improved method of reading out information from a magneto-optic recording element, a method which is improved at least from the standpoint that it is substantially more immune to the noise introduced by undesired variations in the polarization of the read beam, such as those produced by birefringence variations in the recording element's transparent substrate.

Another object of this invention is to provide an apparatus for compensating for undesired, time varying polarization variations of the type described.

Like the prior art methods for reading-out information from a prerecorded magneto-optic recording element, the method of the invention basically comprises the steps of (a) irradiating a prerecorded magneto-optic media through a supporting transparent substrate with a beam of plane polarized radiation; (b) imparting relative movement between such beam and the recording element so that the beam scans the prerecorded information on such recording element; (c) detecting variations in the plane of polarization of the beam as modified by the prerecorded information; and (d) producing an output signal representative of such variations. Unlike the prior art methods, however, the method of the present invention comprises the additional steps of (e) producing an error signal representing relatively low frequency variations in such output signal which are produced by undesired variations in the state of polarization (i.e. polarization angle and/or ellipticity) of the information-modified read-out beam, and (f) using such error signal to vary the state of polarization of the information-modified beam, prior to detection, to compensate for such undesired polarization variations.

The magneto-optic read-out apparatus of the invention is characterized by an electro-magneto-optic feedback loop comprising circuit means that for producing an error signal representing spurious variations in the state of polarization of a plane polarized beam of radiation reflected from a prerecorded magneto-optic media, and means responsive to such error signal for controlling the state of polarization of the reflected beam prior to being monitored by the error signal-producing circuit means. Preferably, the polarization controlling means comprises the combination of a quarterwave plate and a Faraday rotator positioned in the optical path of the reflected beam, such Faraday rotator being responsive to the error signal for minimizing the spurious polarization variations.

The invention and its various advantages will become more apparent to those skilled in the art from the ensuing Detailed Description of Preferred Embodiments, reference being made to the accompanying drawings.

DETAILED DESCRIPTION OF A PREFERRED EMBODIMENT

Figure 1:
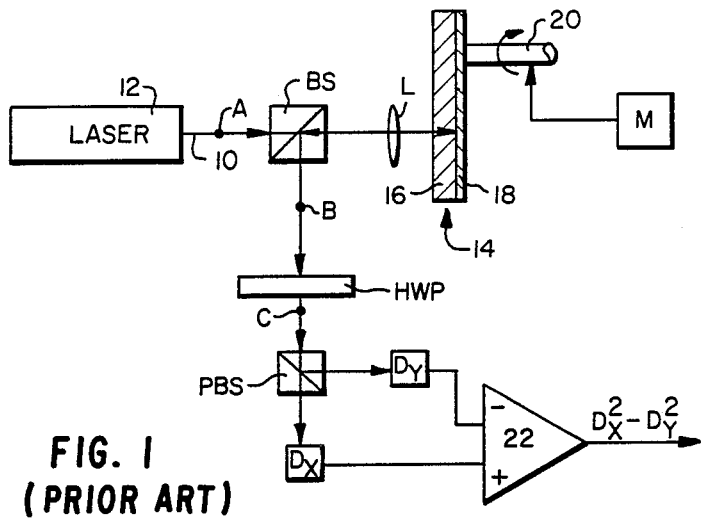
FIG. 1 is a diagrammatic view of a prior art magneto-optic playback system.

Referring now to the drawings, FIG. 1 schematically depicts a conventional magneto-optic read-out system. As shown, a beam 10 of plane polarized radiation, as produced, for example, by a continuous-wave laser 12, is directed through a standard beam-splitter BS onto a magneto-optic recording element 14. Such recording element typically comprises a transparent substrate 16 which supports a pre-recorded magneto-optic recording layer 18. A lens L serves to sharply focus the beam onto the recording layer through the transparent substrate. Substrate 16 may comprise, as mentioned above, a plastic material such as polycarbonate, and the substrate is typically in the form of a rigid disk which is made, for example, by injection molding techniques. Recording layer 18 may comprise any one of a variety of magneto-optic materials which exhibit a relatively strong Kerr effect. A particularly preferred material is a tertiary compound of terbium, iron and cobalt. As schematically shown, the disk is mounted for rotation with a spindle 20 which is rotatably driven by a motor M. Tracking and focusing means (not shown) are provided for maintaining the laser beam in sharp focus on the recording layer and in optical alignment with a desired track of information which, as indicated above, has been previously recorded on the recording layer.

Figure 2A:
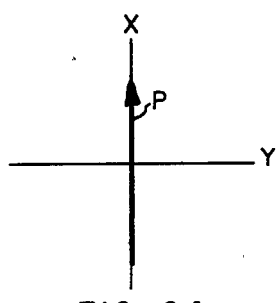
FIGS. 2A–2C illustrate the ideal state of polarization of a read-out beam at various locations in the FIG. 1 system.
Figure 2B:
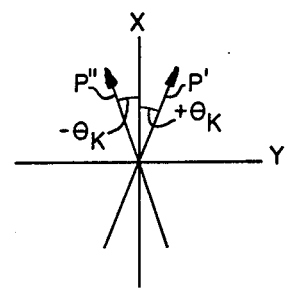
Figure 2C:
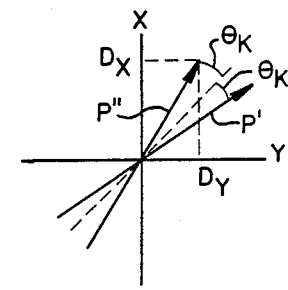
Figure 3:
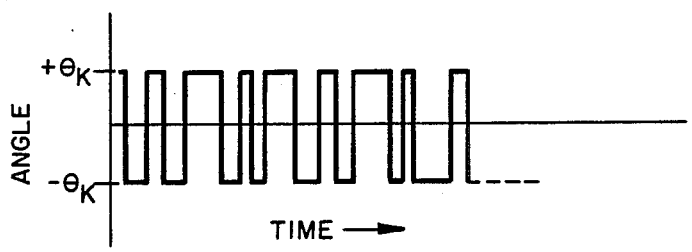
FIG. 3 represents an ideal data train waveform.

In FIGS. 2A–2C, the state of polarization of beam 10 is illustrated at various locations A, B, C along the beam path. As shown in FIG. 2A, at point A, the beam is plane polarized along the system's X axis. Upon encountering the magneto-optic recording layer, the polarization angle is slightly rotated, by the Kerr effect, by an angle $\theta_K$, the so-called Kerr angle. The sign, plus or minus, of the Kerr angle depends upon the direction of vertical magnetization, up or down, of the magnetic domains constituting the recorded information. Thus, as shown in FIG. 2B, the plane polarized beam reflected from the recording layer will have a plane of polarization, P' or P", depending on the magnetic domains encountered. As is apparent, these planes will have an angular separation of $2\theta_K$. It should be noted that $\theta_K$ is shown to greatly exaggerated in the drawings; this angle is usually less than 2°. To facilitate read-out and, at the same time, provide a scheme for rejecting common mode noise, the read beam is passed through a half-wave plate HWP having its fast axis set at 22.5° relative to the system's X axis. This has the effect of rotating the planes of polarization, P' and P", by 45°. Thus, at point C, the two possible states of polarization of the read beam will be as shown in FIG. 2C. Upon emerging from the half-wave plate, the read beam is then passed through a polarizing beam splitter PBS which passes the X component of the read beam to a first detector $D_X$, and the Y component to a second detector $D_y$. The output of the detectors are subtracted in a differential amplifier 22 to provide an output having a waveform similar to that shown in FIG. 3. The frequency of such waveform is typically in the megahertz range.

Figure 4:
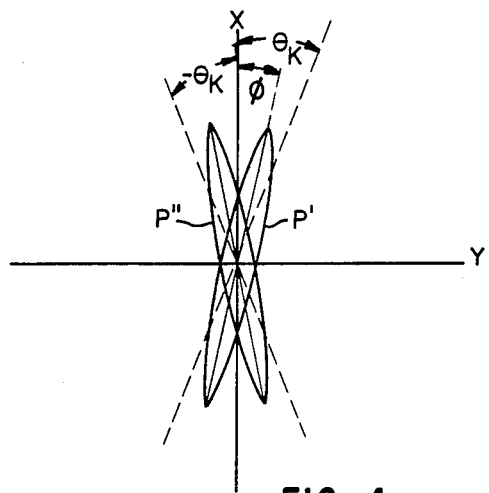
FIG. 4 illustrates a typical state of polarization of a read-out beam after interaction with the recording element.
Figure 5:
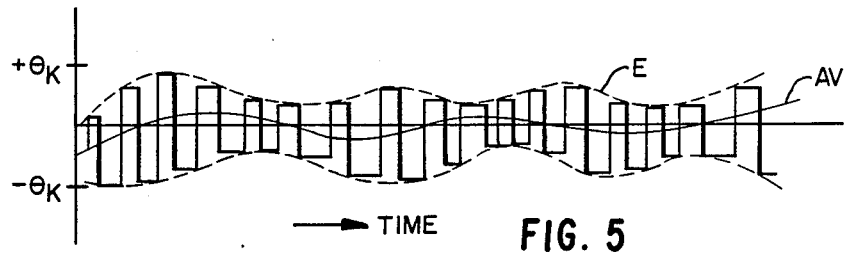
FIG. 5 is a typical waveform of the detector output signal of a conventional magneto-optic playback system.

Up until now, we have discussing a theoretically perfect system, in which the beam reflected by the recording element remains plane polarized. In practical systems, however, the state of polarization of the read beam is undesirably altered, to varying degrees, by spurious sources in the recording element. As indicated above, a major contributor to such undesired polarization variations is the stress-birefringence in the recording element's substrate, such birefringence varying from point to point on the substrate surface. The effect of birefringence is that one component of the incident plane polarized beams is retarded relative to the other, the result being that the beam polarization becomes slightly elliptical, and the kerr angle is slightly less than $\theta_K$. Such birefringence varies from point-to-point on the recording element, as well as with ray angle of the incident beam. The state of polarization of a particular ray of the beam B is best illustrated in FIG. 4. As shown, the two polarization states P' and P" are shown as being slightly elliptical and, moreover, the major axis of each ellipse is rotated by an angle $\phi$ from the X axis, where $\phi$ is somewhat less than $\theta_K$. Actually, the state of polarization varies continuously from ray-to-ray across the beam and as the magneto-optic disk rotates, causing the ellipse to have varying degrees of ellipticity, and causing angle $\phi$ to vary. This varying state of polarization gives rise to an output waveform from the differential amplifier 22 as shown in FIG. 5. It will be noted here that the data train is now amplitude modulated, as indicated by the envelope E, and that the average value AV of the high frequency waveform output is no longer zero, but is offset to a level which varies about zero. This has the adverse effect of thwarting the common mode rejection provided by the detection scheme.

Figure 6:
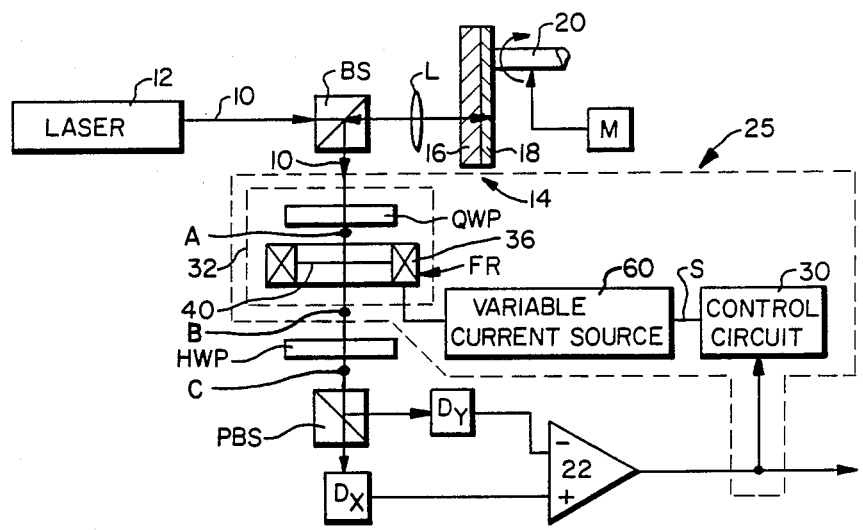
FIG. 6 is a schematic illustration of a magneto-optic playback system embodying the present invention.

In FIG. 6, a magneto-optic readout system embodying the present invention is schematically illustrated. The FIG. 6 system comprises all of the elements already discussed with reference to the FIG. 1 system, and the reference characters denote like parts. Additionally, however, the FIG. 6 system comprises an electro-magneto-optic feedback loop 25 which functions to alter the polarization of the read beam to compensate, at least in part, for the changes produced by spurious sources. Such feedback loop basically comprises feedback circuit means 30 for monitoring the output of differential amplifier 22 and for producing an error signal S representative of relatively low frequency (e.g. KHz) variations in such signal, and magneto-optic means 32, responsive to such error signal, for adjusting the polarization of the beam so that it is closer to the desired polarization state. Such magneto-optic means 32 preferably comprises the combination of a quarterwave plate, QWP, and a Faraday rotator, FR, both being positioned, as shown, in the optical path of the read beam as modified by the recording element.

Figure 10:
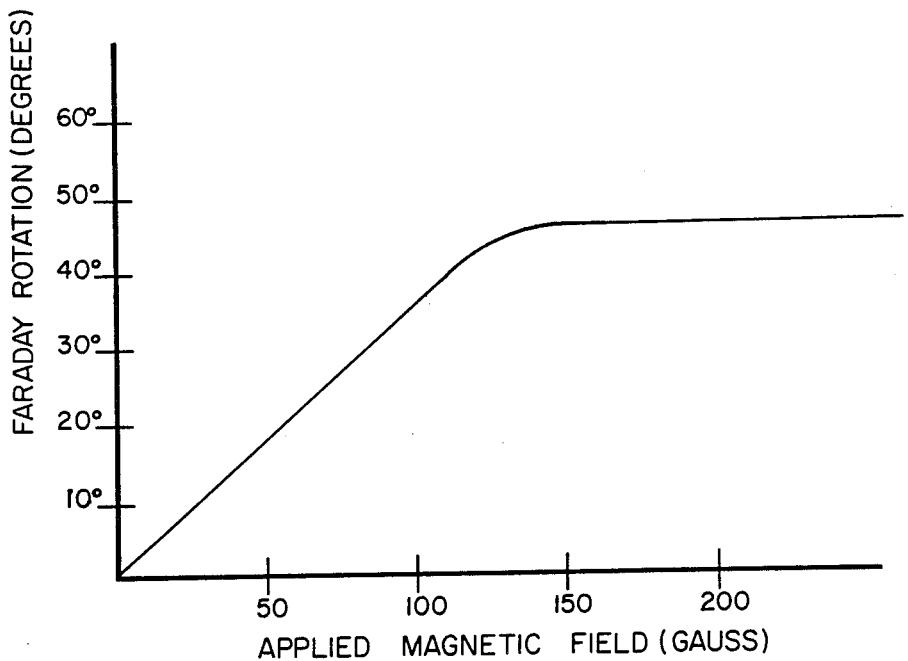
FIG. 10 graphically illustrates the Faraday rotation versus applied magnetic field of a particular type of Faraday rotator.
Figure 11A:
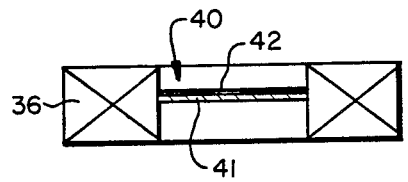
FIGS. 11A and 11B are enlarged cross-sectional and top plan views of a Faraday rotator.
Figure 11B:
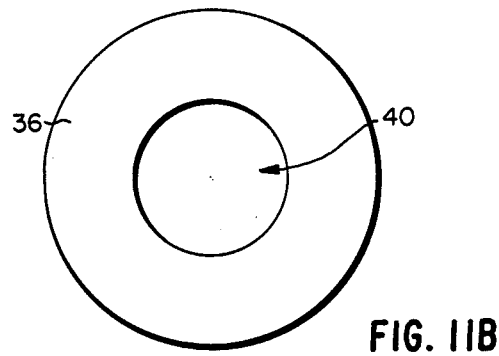

The quarterwave plate and Faraday rotator shown in FIG. 6 are of conventional design, the latter comprising a coil 36 surrounding a transparent isotropic medium 40 having a strong Verdet constant. Coil 36 serves to produce a magnet field in a direction parallel to the optical path of the read beam. The strength of such field is determined by a variable current source 60, the output of which is determined by the waveform of error signal S. Isotropic medium 40 preferably comprises an iron garnet substrate 41 having an epitaxially grown thin film layer 42 of a bismuth-substituted garnet. (See FIGS. 11A and 11B.) Such epi-layer garnets exhibit relatively high Verdet constants, a constant which relates rotation of the planes of vibration of radiation passing through the medium to the path length travelled and to the applied magnetic field. The thickness of substrate 41 is of the order of 1 mm, and the thickness of layer 42 is of the order of about 60 microns. Particularly preferred garnets are those with low absorption and high Verdet constant. Rare earth garnets, such as gadolinium-gallium or neodimium gallium, or doped-rare earth garnets are preferred as substrates. Bismuth-substituted films such as $(GdBi)_3 (FeAlGa)_5O_3$ grown by liquid-phase epitaxy, are particularly preferred materials for layer 42. Such garnet films have been disclosed, for example, by T. Hibiya, et al. in IEEE Transactions of Magnetics, Vol. Mag-22, No. 1, January 1986. The Faraday rotation angle versus applied magnetic field for such films is shown in FIG. 10. Such films exhibit exceptionally high Faraday rotation angles and low absorption at wavelengths at which conventional diode lasers emit (0.78 to 0.830 micrometers).

Figure 7A:
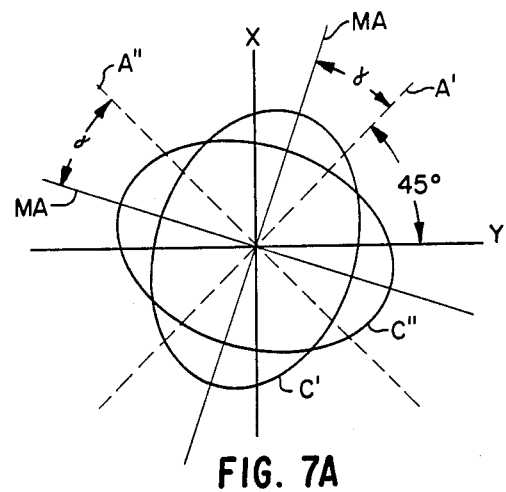
FIGS. 7A–7C illustrate the state of polarization of the read-out beam at different locations in the FIG. 6 apparatus.

The function of the electro-magneto-optic feedback loop 25 can best be described with reference to FIGS. 7A–7C. Quarterwave plate QWP is arranged so that its fast axis A' is set at 45° relative to the system's X and Y axes. The quarterwave plate functions to convert the nearly plane polarized states of polarization of each ray of the read beam incident thereon, represented by either of the polarization states P' and P" shown in FIG. 4, to nearly circularly polarized states C' and C", respectively. As shown in FIG. 7A, the respective major axes MA of polarization states C' and C" are perpendicular to each other. Each axis MA is rotated in the same direction by the same constantly varying angle $\gamma$ relative to the fast and slow axes, A' and A" of the quarterwave plate. Angle $\gamma$ is related to the average value over all rays of the angle $\theta_{\overline{K}\phi}$, the angle by which the actual polarization angle differs from $\theta_K$, the desired angle.

Figure 7B:
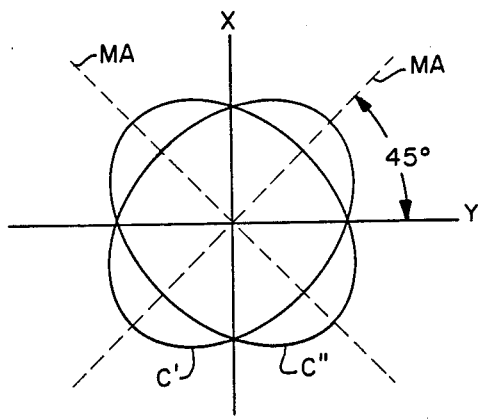

The function of the Faraday rotator and its control circuit 30 continuously adjust the nearly circular polarization states C' and C" by an angle $\gamma$ so that their respective major axes MA are aligned at 45° with respect to the system's X and Y axes, as shown in FIG. 7B.

Figure 7C:
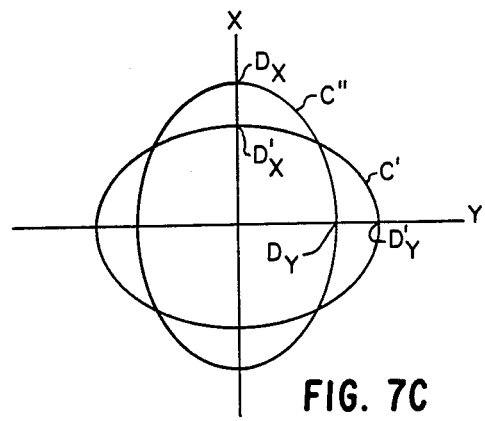

Upon passing through the half-wave plate HWP, the read beam will have either of the two nearly circular polarization states shown in FIG. 7C. The detector pair produces an output signal $D_x^2-D_y^2$ or $D_{x'}^2-D_{y'}^2$.

It is important to note that, without the quarterwave plate QWP, the adjustable Faraday rotator cannot be used to compensate for the spurious changes in polarization of the read beam. If the beam, as represented by the two polarization states P' and P" in FIG. 4, were passed directly through the rotator, both states will be rotated in the same direction, either clockwise or counterclockwise, depending on the direction of current flow through coil 36. While a clockwise rotation will correct for the spurious change in polarization of state P', a clockwise rotation of the other state P" will make matters worse, that is it will be rotated away from the optimum value of $-\theta_K$.

Figure 8A:
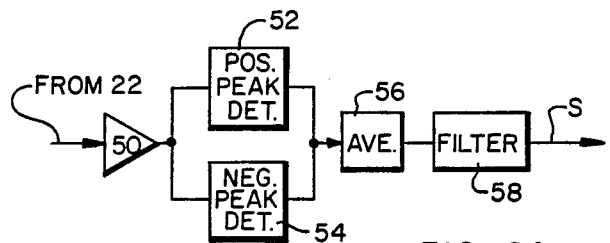
FIGS. 8A and 8B are electrical schematics of circuits useful in the FIG. 6 apparatus.
Figure 8B:
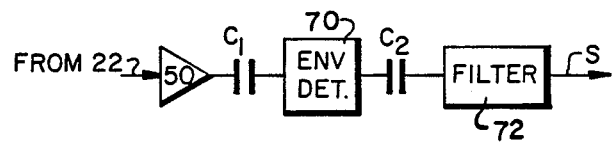
Figure 9A:
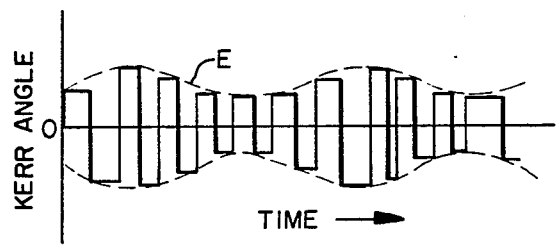
FIGS. 9A and 9B illustrate the waveform of the detector output as corrected by the FIG. 6 apparatus.
Figure 9B:
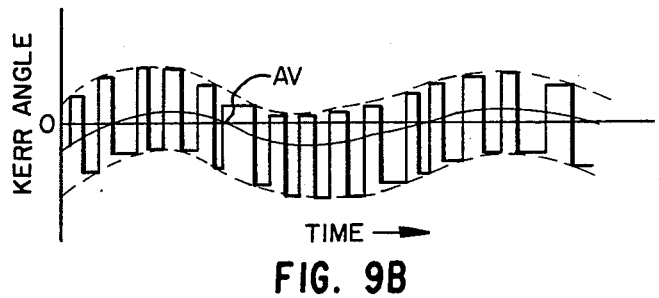

In order to drive the Faraday rotator so that it achieves the desired compensation effect, the control circuit 30 may take either of the forms shown in FIGS. 8A or 8B. The circuit shown in FIG. 8A functions to produce an error signal S having a waveform which is substantially the negative of the average value waveform AV shown in FIG. 5. It basically comprises a buffer 50, a pair of peak detectors 52, 54, connected in parallel, averaging circuit 56, and a filter 58. The output error signal S is used to control the current from the variable current source 60 which, in turn, controls the current in coil 36. Peak detectors, 52, 54 serve respectively, to detect the positive and negative excursions of the envelope E (shown in FIG. 5), and the averaging circuit provides the average of the peak detector outputs. Filter 58 changes the polarity of its input so that the error signal S is of the appropriate sign when applied to the current source to produce the desired compensating effect. Filter 58 also compensates for the system dynamics (e.g. the response time of the Faraday rotator) so that the correction signal is applied at the appropriate time. Thus depending on the instantaneous amplitude of signal S, the coil current is adjusted so that the average value of the FIG. 5 waveform is zero. Such a waveform is shown in FIG. 9A. While the "corrected" waveform shown in FIG. 9A is still amplitude modulated, it nevertheless is more desirable than the FIG. 5 waveform in that common mode rejection of noise has taken place.

Rather than minimizing the variations in average value of the detector output, it is possible to minimize the amplitude modulation of the FIG. 5 waveform. This can be done by producing an error signal having a waveform representing the negative of the envelope of such amplitude modulation. A control circuit for producing such a signal is schematically illustrated in FIG. 8B. Such circuit basically comprises a high input impedance buffer amplifier 50 for minimizing any drain on the output of amplifier 22 by the feedback network, an envelope detecting circuit 70, a filter 72, and a pair of capacitors C1 and C2 for eliminating and DC components in the inputs to the envelope detector and filter.

It should be noted that compensation of both the offset waveform, AV, and the envelope modulation waveform, E, would be obtained simultaneously if the spurious signal, produced for example by the birefringence of the substrate, were independent of the ray angle incident on the recording element. However, this is in general not the case, so that the spurious waveforms AV and E can not be simultaneously eliminated.

From the foregoing, it is apparent that a relatively simple apparatus has been provided for reducing noise in a magneto-optic recording system. As a result, noisier system components, e.g. recording element substrates with relative large variations in birefringence, can be tolerated.

The invention has been described in detail with particular reference to preferred embodiments thereof, but it will be understood that variations and modifications can be effected within the spirit and scope of the invention.

What is claimed is:

1. In a method for reading information recorded on a magneto-optic recording element, such method including the steps of (i) scanning the recording element with a beam of plane polarized radiation; (ii) detecting rotational changes in the plane of polarization of the beam as modified by the recorded information; and (iii) producing a relatively high frequency output signal proportional to such changes, the improvement comprising:
   (a) monitoring the output signal to detect low frequency variations of such signal and producing an error signal representative of such variations; and
   (b) using such error signal to modify the polarization of the beam prior to said detecting step to minimize such variations.

2. The method as defined by claim 1 wherein such error signal is sued to establish and control a magnetic field along the optical path traversed by the beam as modified by the recorded information.

3. The method as defined by claim 1 wherein the output signal is monitored to detect low frequency variations in its average value, and wherein the error signal is representative of such variations in average value.

4. The method as defined by claim 1 wherein the high frequency output signal is monitored to detect low frequency variations in the envelope of such signal, and wherein the error signal is representative of such variations in the envelope of the output signal.

5. In an apparatus for reading information recorded on a magneto-optic recording element, said apparatus comprising (i) means for rapidly scanning the recording element with a beam of plane polarized radiation; (ii) means for detecting changes in the plane of polarization of the beam as modified by the recorded information; and (iii) means for producing a time-varying output signal proportional to such changes; the improvement comprising:

(a) circuit means for monitoring said output signal to detect low frequency variations of such signal and for producing an error signal proportional to such variations; and (b) means responsive to said error signal for varying the polarization of such beam prior to detection so as to minimize such variations.

6. The apparatus as defined by claim 5 wherein said circuit means comprises means for producing an error signal proportional to the average value of said output signal.

7. The apparatus as defined by claim 5 wherein said circuit means comprises means for producing an error signal representative of changes in the envelope of said output signal.

8. The apparatus as defined by claim 5 wherein said polarization varying means comprises the combination of a quarterwave plate and a Faraday rotator positioned along the optical path of the modified beam.

9. The apparatus as defined by claim 5 wherein said Faraday rotator comprises an epitaxially grown bismuth-substituted garnet thin film disposed on a garnet substrate.

10. The apparatus as defined by claim 9 wherein said bismuth-substituted thin film comprises $(GdBi)_3 (FeAlGa)_5 O_{12}$.

* * * * *